(12) United States Patent
Lee

(10) Patent No.: US 7,147,685 B2
(45) Date of Patent: Dec. 12, 2006

(54) FILTER COVER ASSEMBLY FOR AN AIR CONDITIONING UNIT

(75) Inventor: Heon-Gu Lee, Seoul (KR)

(73) Assignee: Halla Climate Control Corporation, Daejeon-si (KR)

( * ) Notice: Subject to any disclaimer, the term of this patent is extended or adjusted under 35 U.S.C. 154(b) by 360 days.

(21) Appl. No.: 10/790,012

(22) Filed: Mar. 2, 2004

(65) Prior Publication Data

US 2004/0172927 A1    Sep. 9, 2004

(30) Foreign Application Priority Data

Mar. 3, 2003  (KR) .................. 10-2003-0013081

(51) Int. Cl.
*B01D 35/30*     (2006.01)
(52) U.S. Cl. .............................. 55/467; 55/481; 55/504

(58) Field of Classification Search .................. 55/467,
55/481, 490, 495, 504, 385.6; 454/236
See application file for complete search history.

(56) References Cited

U.S. PATENT DOCUMENTS 6,264,713 B1 *   7/2001   Lewis, II ..................... 55/481

* cited by examiner

*Primary Examiner*—Robert A. Hopkins
(74) *Attorney, Agent, or Firm*—Lowe, Hauptman & Berner

(57) ABSTRACT

A filter cover assembly for an air conditioning unit is disclosed. The filter cover assembly allows a user to easily install a filter in a casing of an air conditioning unit through an opening provided on the casing and to easily remove and mount the filter cover assembly from and to the opening of the casing, so that the user can conveniently exchange the filters. The filter cover assembly is mounted to the opening of the casing of the air conditioning unit to close the opening, with a filter installed in the casing to remove impurities from air flowing into the air conditioning unit. The filter cover assembly includes a first filter cover, a second filter cover and a rotary fastening unit to fasten the first filter cover to the second filter cover.

9 Claims, 7 Drawing Sheets

FILTER COVER ASSEMBLY FOR AN AIR CONDITIONING UNIT

BACKGROUND OF THE INVENTION

1. Field of the Invention

The present invention relates, in general, to filter cover assemblies for an air conditioning unit and, more particularly, to a filter cover assembly for air conditioning units which allows a user to easily install a filter in a casing of an air conditioning unit through an opening provided on the casing, and to easily remove and mount the filter cover assembly from and to the opening of the casing, so that the user can conveniently exchange the filters when necessary.

2. Description of the Prior Art

Filters are important elements that are installed in a variety of fluid paths to remove impurities from fluids, such as air or water, flowing through the fluid paths with minimum flowing resistance and maximum filtering efficiency. Particularly, an air filter used in an air conditioning apparatus of a vehicle is installed at a predetermined position within an air flowing path of the air conditioning apparatus to remove impurities from air while the air is fed into the passenger compartment of the vehicle after the air is being conditioned.

To accomplish an air conditioning effect for the passenger compartment of a vehicle, atmospheric air is forced into the passenger compartment after being processed by the air conditioning apparatus. During the operation of a conventional air conditioning apparatus for vehicles, atmospheric air is forcibly drawn by a suction force of a blower fan installed in the air flowing path into the air conditioning apparatus through a cowl that functions as an outside air inlet of the air conditioning apparatus. In the conventional air conditioning apparatus for the vehicles, the inlet air passes through a heat exchanger, such as an evaporator or a heater, to be cooled or heated, prior to being discharged into the passenger compartment through a plurality of air discharging grilles provided at predetermined positions within the passenger compartment.

While the conditioned air is fed into the passenger compartment of the vehicle, it is necessary to remove a variety of impurities from the air using an air filter. Typically, the air filter is installed at a predetermined position in the air flowing path of the air conditioning apparatus, for example, at a position in front of the evaporator of an evaporator unit or within a blower unit that draws the atmospheric air into the air conditioning apparatus. The evaporator unit and the blower unit of the air conditioning apparatus are examples of air conditioning units of the apparatus.

As the air filter has been used for a lengthy period, an excessive amount of impurities is deposited on a filtering surface of the filter, thus increasing the air flowing resistance and reducing the air blowing efficiency of the blower fan. Therefore, existing filters of the air conditioning apparatuses must be periodically changed with new ones. To allow a user to easily change an existing filter with a new one, an air conditioning unit, such as the evaporator unit or the blower unit, having the filter has an opening on a casing thereof to allow a user's hand to reach a desired place within the casing. A filter cover assembly is mounted to the opening of the casing, thus closing the opening. Due to the opening of the casing closed by the filter cover assembly, the user can remove an existing filter from the casing and install a new filter on the desired place within the casing through the opening after removing the filter cover assembly from the opening.

The construction of a representative example of conventional filter cover assemblies for air conditioning units is described herein below, with reference to FIG. 1. In the following description, the air conditioning unit having the filter cover assembly is an evaporator unit. However, when the filter is installed in a blower unit, in place of the evaporator unit, the filter cover assembly will be mounted to a casing of the blower unit.

As shown in FIG. 1, the conventional filter cover assembly 5 is detachably mounted to an opening 11 formed on a side surface of an evaporator casing 10, so that the filter cover assembly 5 closes the opening 11. The evaporator casing 10 houses an evaporator 20 therein. The filter cover assembly 5 constitutes an evaporator unit 110, in cooperation with the evaporator 20, an air filter 40, and the evaporating casing 10 that supports both the evaporator 20 and the filter 40 therein.

The conventional filter cover assembly 5 comprises a cover body 51 and a seal 52. The seal 52 is attached at a bonding surface 521 thereof to a rear surface of the cover body 51 to accomplish a desired sealing effect for the opening 11 when the filter cover assembly 5 is mounted to the opening 11. The cover body 51 is a rectangular body, with a peripheral contact surface 511 formed around the outside edge of the rear surface of the cover body 51. The contact surface 511 is seated on a seating surface 11a formed around the edge of the opening 11 of the casing 10, so that the contact surface 511 can seal the junction between the filter cover assembly 5 and the opening 11, in cooperation with the seal 52. The cover body 51 is depressed rearward at a predetermined area of a central portion thereof inside the peripheral contact surface 511, thus forming a longitudinal reinforcing part 512 to increase the structural strength of the cover body 51. At least one fitting protrusion 513 extends downward from the lower edge of the cover body 51. The fitting protrusion 513 is inserted into a fitting slot 12 that is provided on the side surface of the casing 10 at a position under the opening 11. A hook part 514 having a locking slot 514a perpendicularly extends rearward from the upper edge of the cover body 51 to be locked through a snap locking manner to a locking protrusion 13 formed on an upper surface of the casing 10.

Due to the above-mentioned construction, the cover body 51 is mounted to the casing 10 by primarily inserting the fitting protrusion 513 of the cover body 51 into the fitting slot 12 of the casing 10, and by secondarily locking the locking slot 514a of the hook part 514 to the locking protrusion 13 of the casing 10 through the snap locking manner. In the above state, the contact surface 511 of the cover body 51 is placed on the seating surface 11a of the opening 11 of the evaporator casing 10.

The seal 52 which is a gasket, is attached at the bonding surface 521 thereof to the rear surface of the cover body 51, so that the seal 52 removes the gap from the junction between the contact surface 511 of the cover body 51 and the seating surface 11a of the opening 11 when the cover body 51 is mounted to the opening 11 of the casing 10. Thus, the seal 52 seals the junction between the filter cover assembly 5 and the opening 11.

To mount the conventional filter cover assembly 5 to the opening 11 of the casing 10, the hook part 514 of the cover body 51 must be locked to the locking protrusion 13 of the casing 10 through the snap locking manner. However, since the hook part 514 perpendicularly extends rearward from the upper edge of the cover body 51, the hook part 514 may often interfere with surrounding elements, including the evaporator casing 10. Furthermore, the conventional filter cover assembly 5 having both the cover body 51 and the seal 52 must be forcibly removed from and mounted again to the evaporator casing 10 when desired to exchange the filters, thus reducing work efficiency and being inconvenient to the user during a process of changing the filters.

SUMMARY OF THE INVENTION

Accordingly, the present invention has been made keeping in mind the above problems occurring in the prior art, and an object of the present invention is to provide a filter cover assembly for air conditioning units which is prevented from interfering with surrounding elements, including a casing of an air conditioning unit that supports a filter therein, and which allows a user to easily and quickly remove and mount the filter cover assembly from and to the casing while exchanging the filters.

In order to achieve the above object, the present invention provides a filter cover assembly mounted to an opening of a casing of an air conditioning unit to close the opening, with a filter installed in the casing to remove impurities from air flowing into the air conditioning unit, comprising: a first filter cover; a second filter cover; and a fastening unit to fasten the first filter cover to the second filter cover, wherein the first filter cover comprises a first cover body to close a predetermined portion of the opening of the casing, with joining parts provided on the first cover body to be locked to the casing, and the second filter cover comprises a second cover body to close a remaining part of the opening, with a engaging part provided on the second cover body to engage with the fastening unit.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Figure 1:
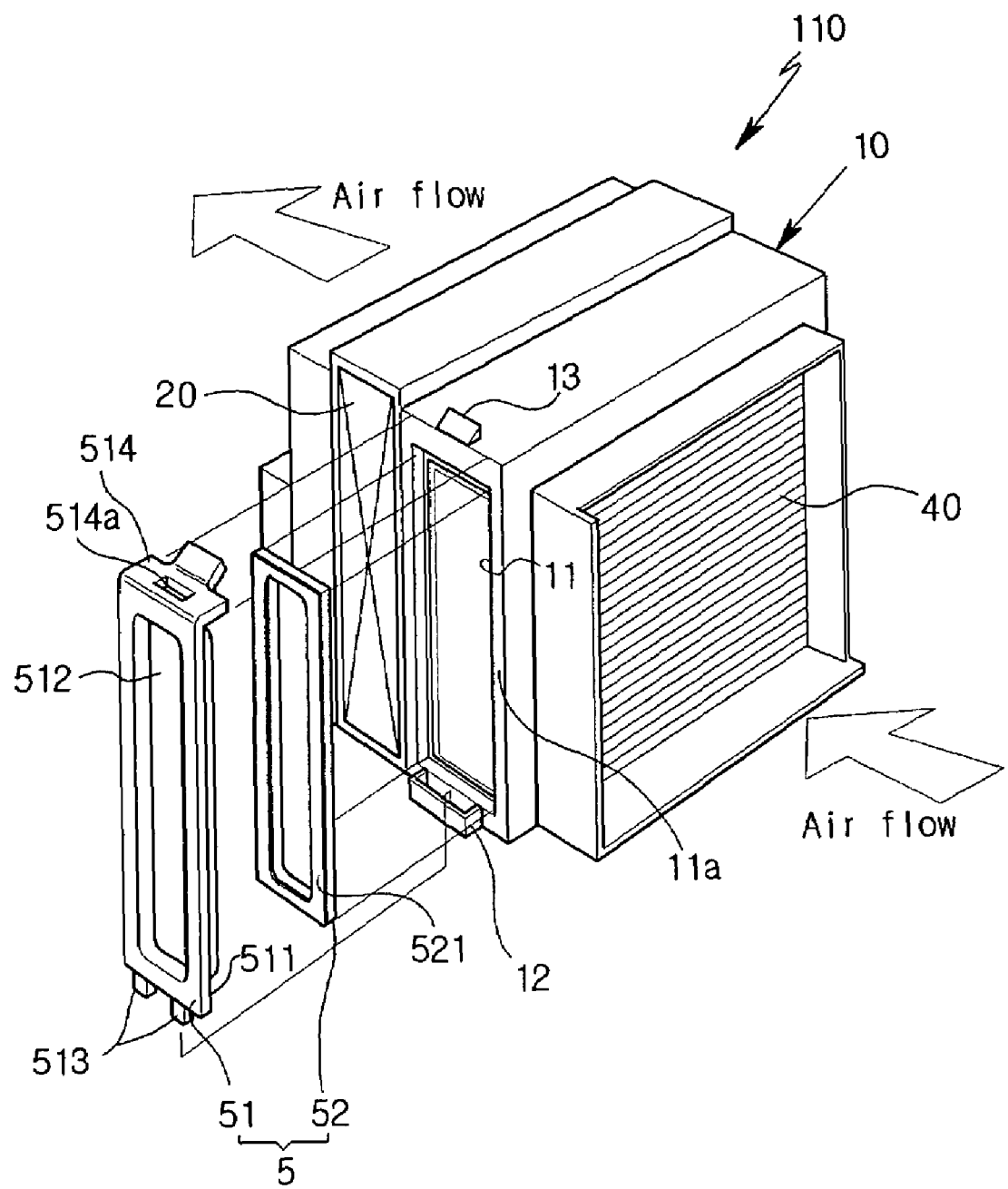
FIG. 1 is an exploded perspective view showing the construction of a conventional filter cover assembly provided on a casing of an evaporator unit which is an air conditioning unit.

Reference will now be made in greater detail to preferred embodiments of the invention, examples of which are illustrated in the accompanying drawings. Wherever possible, the same reference numerals will be used throughout the drawings and the description to refer to the same or like parts. In the preferred embodiments of the present invention, a filter cover assembly is provided on a casing of a blower unit which has a filter. However, when the filter is installed in an evaporator unit, in place of the blower unit, the filter cover assembly will be mounted to a casing of the evaporator unit.

Figure 2:
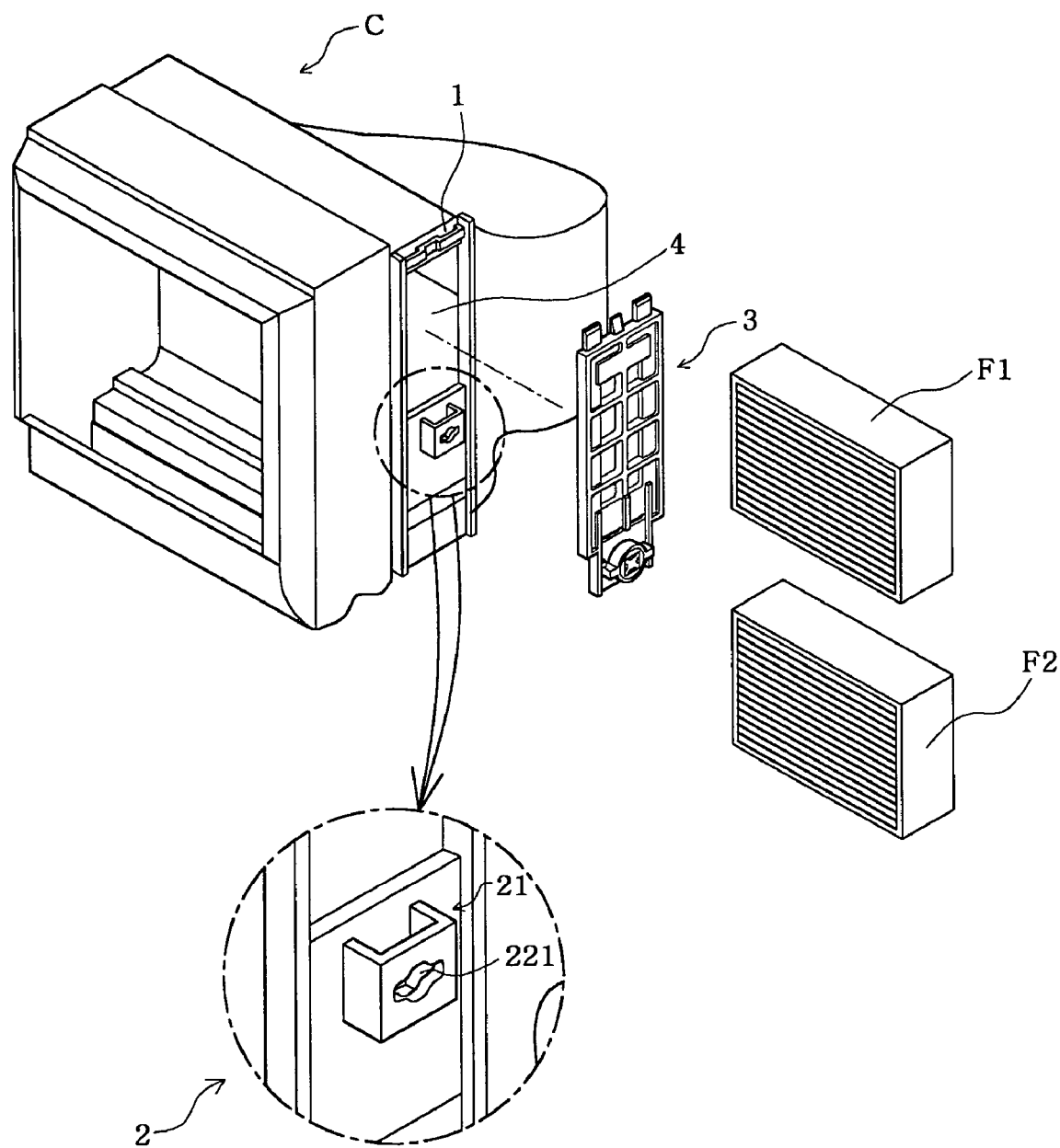
FIG. 2 is an exploded perspective view showing the construction of a filter cover assembly provided on a casing of a blower unit which is an air conditioning unit, according to a first embodiment of the present invention.

As shown in FIG. 2, the filter cover assembly according to the first embodiment of the present invention is mounted to an opening 4 of a casing C of a blower unit which is an air conditioning unit, with two filters F1 and F2 installed in the casing C to remove impurities from air passing through the blower unit. The filter cover assembly according to the first embodiment comprises a first filter cover 3, a second filter cover 2, and a rotary fastening unit 32 which fastens the first filter cover 3 to the second filter cover 2.

Figure 3:
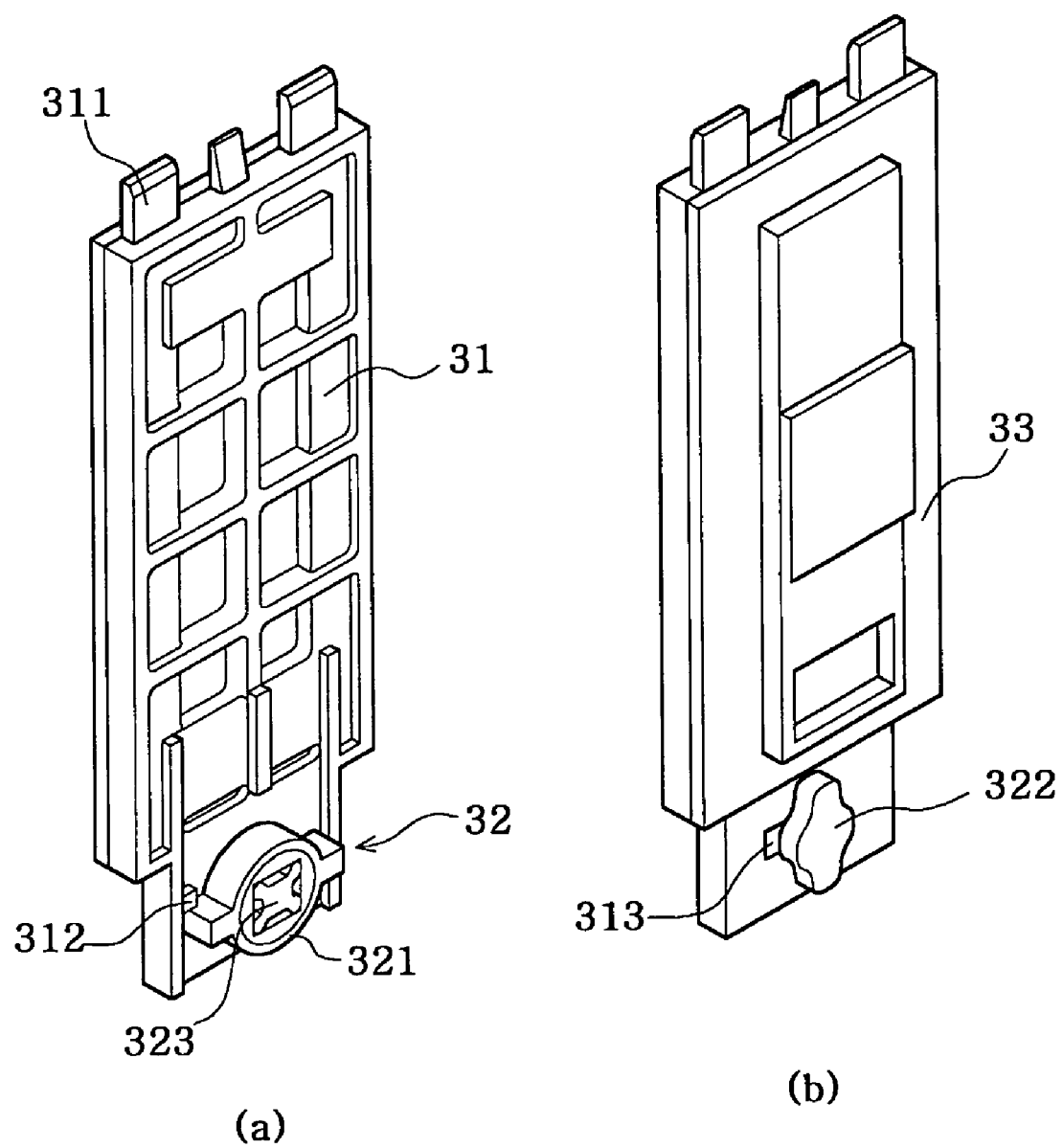
FIGS. 3A and 3B are front and rear perspective views of a first filter cover which constitutes the filter cover assembly of FIG. 2.

As shown in FIGS. 3A and 3B, the first filter cover 3 includes a cover body 31, with a plurality of fitting protrusion 311 extend upward from the upper edge of the cover body 31. The cover body 31 of the first filter cover 3 further includes a hole 313 at a lower portion thereof, so that a locking member 322 and a shaft 323 of the rotary fastening unit 32 passes through the hole 313, as will be described in detail later herein. The cover body 31 further includes a peripheral contact surface which is formed around an outside edge of a rear surface of the cover body 31. The contact surface of the cover body 31 is seated on a seating surface formed around an edge of the opening 4 of the casing C, with a seal attached to the contact surface of the cover body 31. Thus, the cover body 31 of the first filter cover 3 closes an upper part of the opening 4, and preferably has a stop protrusion 312 to stop excessive rotation of the rotary fastening unit 32.

The second filter cover 2 includes a cover body which is integrally formed on a side surface of the casing C of the blower unit to close a lower part of the opening 4. The second filter cover 2 further includes a engaging part to engage with the rotary fastening unit 32 and fasten the first filter cover 3 to the first filter cover 2. In the first embodiment, the engaging part comprises a locking bracket 21 which is provided on the cover body of the second filter cover 2 to engage with the locking member 322 of the rotary fastening unit 32. A fitting slot 1 is provided on the side surface of the casing C at a position above the opening 4 to receive the fitting protrusion 311 of the first filter cover 3 therein.

Figure 6:
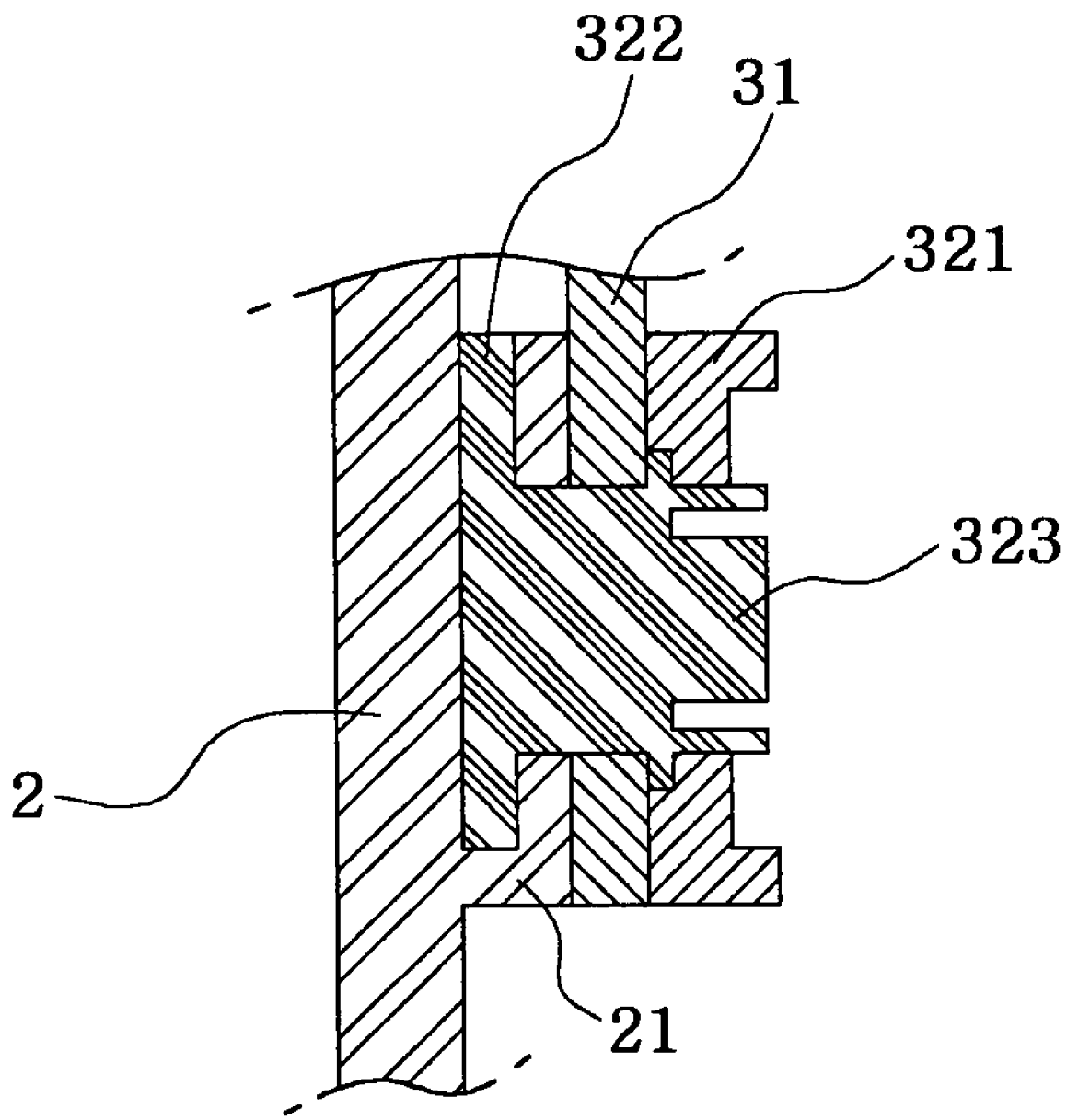
FIG. 6 is a sectional view taken along the line A—A of FIG. 5.

The rotary fastening unit 32 comprises a rotary knob 321, the locking member 322 and the shaft 323. The shaft 323 connects the rotary knob 321 to the locking member 322 into a single body while spacing the rotary knob 321 and the locking member 322 apart from each other by a predetermined distance. In the present invention, the distance between the rotary knob 321 and the locking member 322 is determined to be almost equal to the sum of a thickness of the cover body 31 and a thickness of a front wall of the locking bracket 21 as best seen in FIG. 6. In the rotary fastening unit 32, the rotary knob 321 and the locking member 322 are preferably coupled together to cross each other at a right angle.

The locking bracket 21 of the second filter cover 2 has a locking hole 221 at the front wall thereof. The locking hole 221 has a shape corresponding to the locking member 322 of the rotary fastening unit 32, so that the locking member 322 can be inserted into the locking bracket 21 through the locking hole 221.

The operation and effect of the filter cover assembly according to the first embodiment will be described herein below.

FIG. 2 shows the first filter cover 3 which is detached from the second filter cover 2 of the casing C. Thus, the upper part of the opening 4 is opened, so that a user can sequentially install the filters F1 and F2 on the predetermined positions in the casing C through the opening 4.

After the filters F1 and F2 are completely installed in the casing C, the first filter cover 3 is mounted to the casing C to close the upper part of the opening 4. To mount the first filter cover 3 to the casing C, the fitting protrusion 311 of the first filter cover 3 are primarily inserted into the fitting slot 1 of the casing C.

Figure 4:
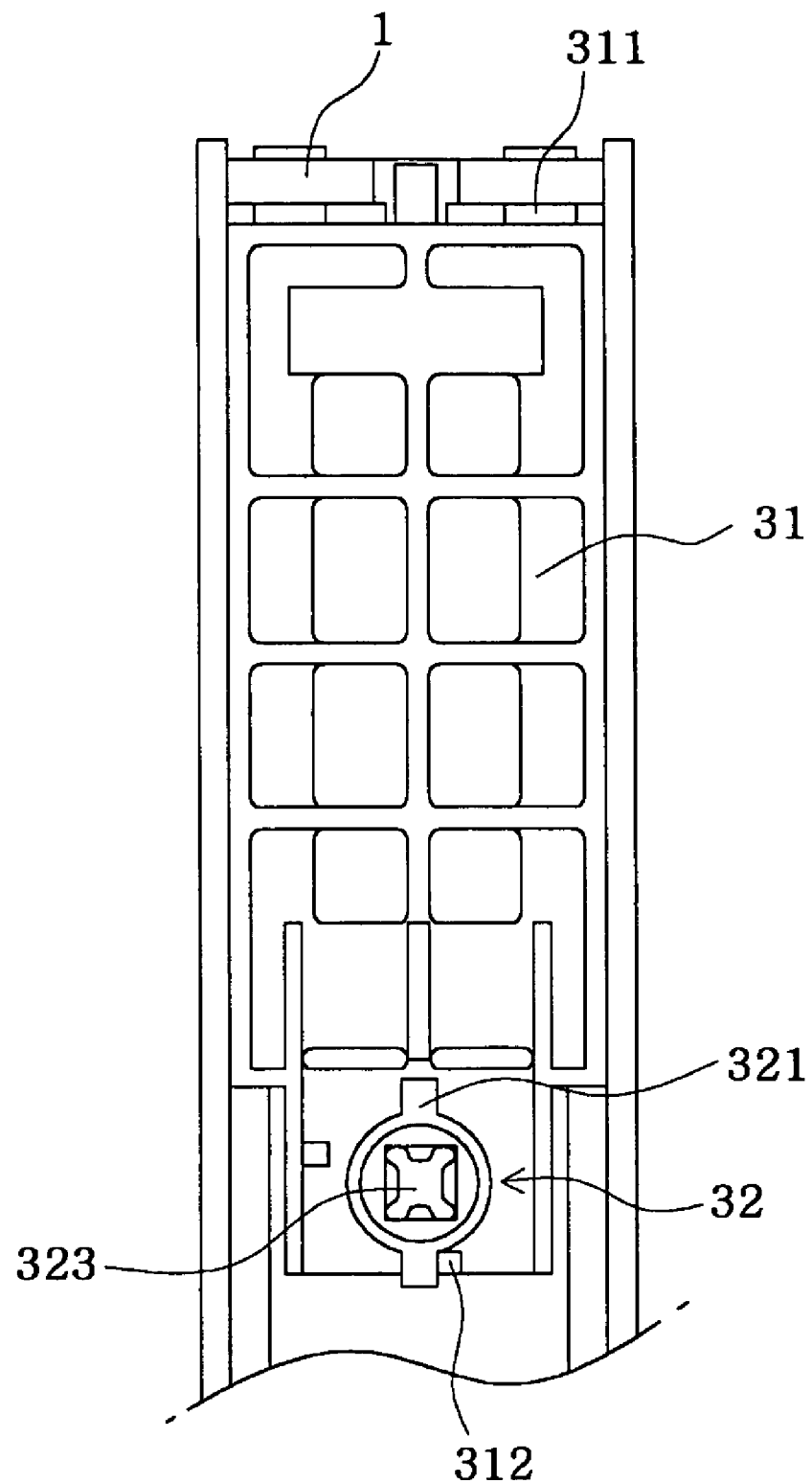
FIG. 4 is a front view of the filter cover assembly of FIG. 2 which is placed in a designated position on the casing of the blower unit before a rotary knob of the first filter cover is rotated to fasten the first filter cover to a second filter cover.
Figure 5:
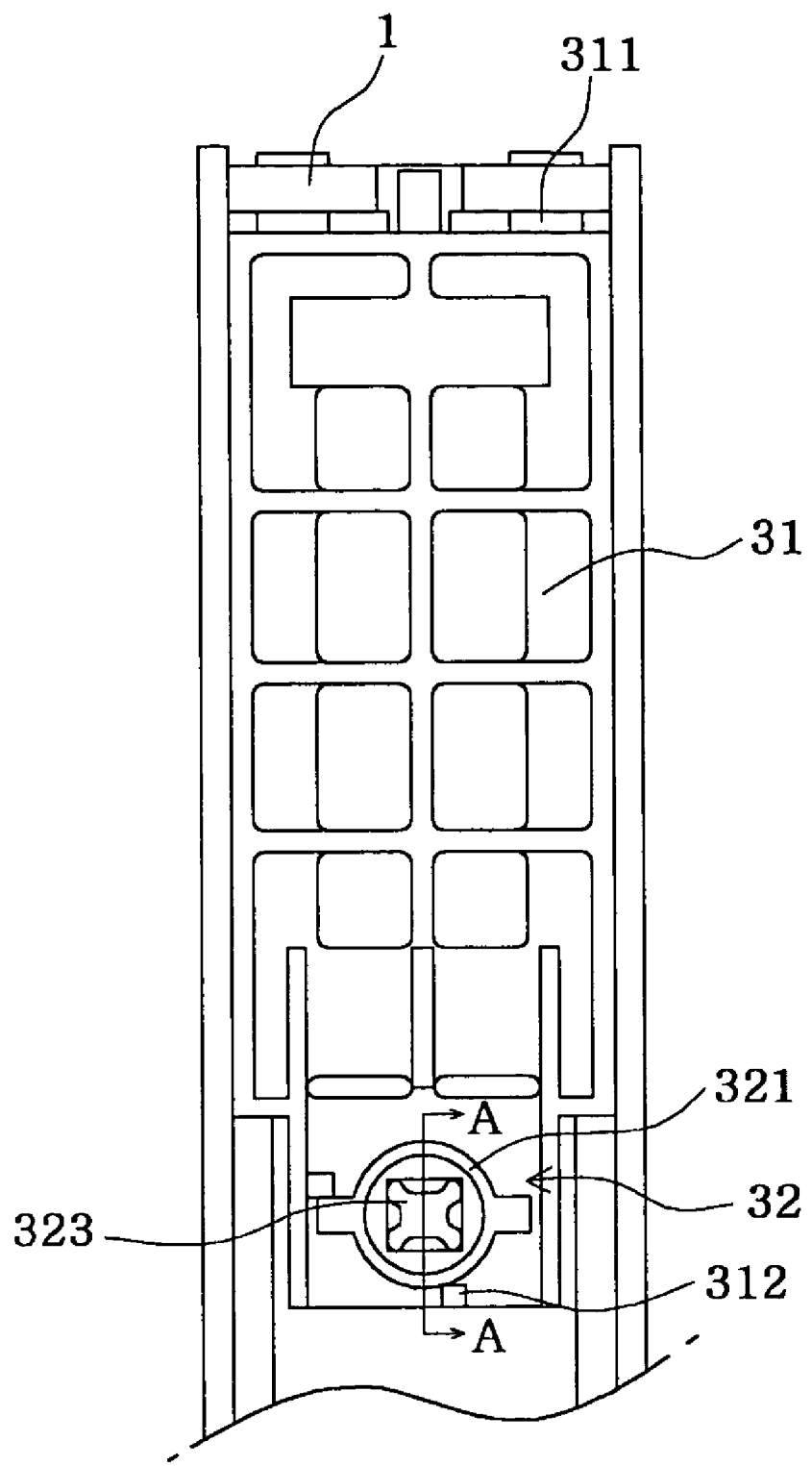
FIG. 5 is a front view of the filter cover assembly of FIG. 2 which is mounted to the casing of the blower unit after the rotary knob of the first filter cover has been rotated to fasten the first filter cover to the second filter cover.

Thereafter, the locking member 322 of the rotary fastening unit 32 is inserted into the locking bracket 21 through the hole 221, as shown in FIG. 4. After the locking member 322 is inserted into the locking bracket 21, the rotary knob 321 is rotated clockwise at an angle of about 90° until a wing of the rotary knob 321 is stopped by the stop protrusion 312, as shown in FIG. 5. In the above state, the rotary knob 321 is placed in a horizontal direction, and the locking member 322 of the fastening unit 32 locks the first filter cover 3 to the second filter cover 2.

As described above, the distance between the rotary knob 321 and the locking member 322 is almost equal to the sum of the thickness of the cover body 31 and the thickness of the front wall of the locking bracket 21. Therefore, when the rotary knob 321 is rotated at an angle of about 90° so as to be placed in the horizontal direction, the front wall of the locking bracket 21 is compressed between the locking member 322 of the rotary fastening unit 32 and the cover body 31, as shown in FIG. 6.

To open the opening 4 of the casing C prior to changing an existing filter with a new one, the above-mentioned, process is executed in the reverse order.

In the first embodiment of the present invention, the filter cover assembly is used with the casing C which houses two separate filters F1 and F2 therein. However, the filter cover assembly of the present invention may be used with a casing which houses an integrated filter with a size similar to that of the filter 40 shown in FIG. 1. Of course, in the above state, it may be required to change both the position of the second filter cover 2 on the casing C and the length of the first filter cover 3.

Figure 7:
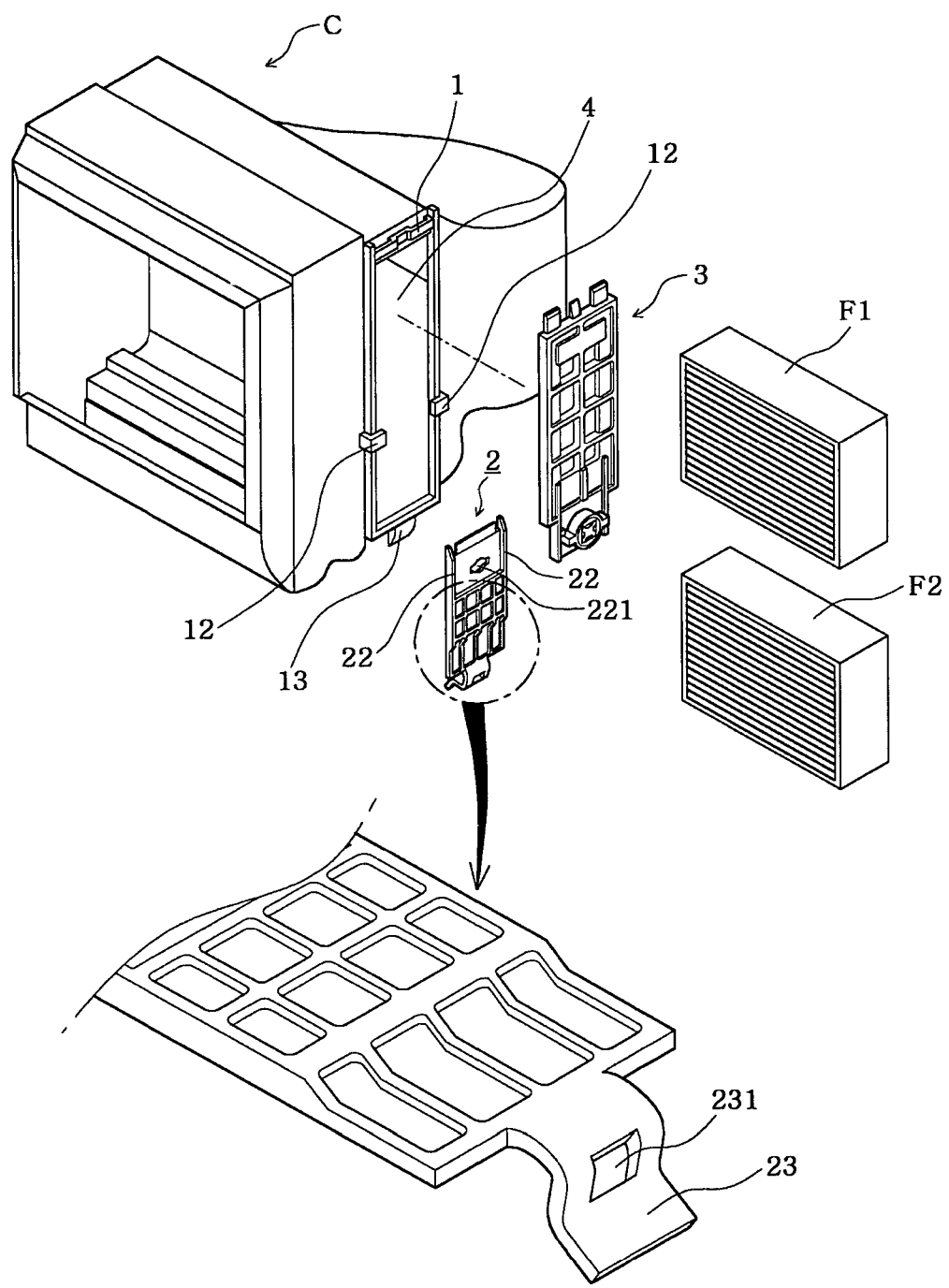
FIG. 7 is an exploded perspective view showing the construction of a filter cover assembly provided on a casing of a blower unit which is an air conditioning unit, according to a second embodiment of the present invention.

FIG. 7 shows the construction of a filter cover assembly for air conditioning units, according to a second embodiment of the present invention.

In the second embodiment, the second filter cover 2 is constructed so that the cover 2 is separated from a casing C of a blower unit, different from the first embodiment.

The construction of the filter cover assembly according to the second embodiment will be described with reference to FIGS. 3A, 3B and 7. In the filter cover assembly according to the second embodiment, a joining part 23 having a slot 231 extends downward from a lower edge of the second filter cover 2 to be detachably locked to the casing C of the blower unit. The second filter cover 2 further includes a engaging part which comprises only a hole 221 provided at an upper portion of the second filter cover 2. The hole 221 has a shape corresponding to the locking member 322 of the rotary fastening unit 32, so that the locking member 322 is locked to the second filter cover 2 through the hole 221. The casing C has a pair of support units 15 at an edge of the opening 4 to support the second filter cover 2, and a locking protrusion 16 to engage with the slot 231 of the joining part 23 of the second filter cover 2.

The general shape of the filter cover assembly according to the second embodiment, except for the above-mentioned construction of the second filter cover 2, remains the same as that described for the first embodiment, and further explanation is thus not deemed necessary.

The operation and effect of the filter cover assembly according to the second embodiment will be described herein below.

FIG. 7 shows the first filter cover 3 and the second filter cover 2 which are separated from the casing C.

Thus, the opening 4 of the casing C is opened, so that a user can install the filters F1 and F2 in the casing C through the opening 4.

After the filters F1 and F2 are completely installed in the casing C, the second filter cover 2 is closely installed in a lower portion of the opening 4 by sliding the cover 2 inside the support units 15 of the opening 4. In the above state, the slot 231 of the joining part 23 of the second filter cover 2 is fitted over the locking protrusion 16 of the casing C, and thus, the second filter cover 2 is securely mounted to the opening 4. The second filter cover 2 closes a lower part of the opening 4. In the above state, the two support units 15 of the casing C support both side surfaces 22 of the second filter cover 2, so that the second filter cover 2 is further securely mounted to the opening 4.

The first filter cover 3 is, thereafter, mounted to the casing C to close an upper part of the opening 4, in the same manner as the first embodiment. To mount the first filter cover 3 to the casing C, the fitting protrusion 311 of the first filter cover 3 are primarily inserted into the fitting slot 1 of the casing C.

Thereafter, the locking member 322 of the rotary fastening unit 32 is inserted into the second filter cover 2 through the hole 221. The rotary knob 321 of the fastening unit 32 is, thereafter, rotated clockwise at an angle of about 90°, so that the rotary knob 321 is placed in a horizontal direction. Thus, the locking member 322 locks the first filter cover 3 to the second filter cover 2.

In the above state, the rotary knob 321 is connected to the locking member 322 by a shaft 323 which spaces the rotary knob 321 and the locking member 322 apart from each other by a predetermined distance which is almost equal to the sum of the thickness of the cover body 31 and a thickness of the locking hole 221 of the second filter cover 2. Therefore, when the rotary knob 321 of the fastening unit 32 is rotated, the second filter cover 2 is compressed between the rotary knob 321 and the locking member 322 of the fastening unit 32.

To open the opening 4 of the casing C prior to changing an existing filter with a new one, the above-mentioned process is executed in the reverse order.

The filter cover assembly according to the second embodiment having the above-mentioned construction may be effectively used with a casing having an integrated filter with a size similar to that of the filter 40 shown in FIG. 1.

As apparent from the above description, the present invention provides a filter cover assembly for air conditioning units. The filter cover assembly is prevented from interfering with surrounding elements, including a casing of an air conditioning unit that supports a filter therein, and allows a user to easily and quickly remove and mount the filter cover assembly from and to the casing while changing an existing filter with a new one.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A filter cover assembly mounted to an opening of a casing of an air conditioning unit to close the opening, with a filter installed in the casing to remove impurities from air flowing into the air conditioning unit, comprising:
   a first filter cover;
   a second filter cover; and
   a fastening unit to fasten the first filter cover to the second filter cover,
   wherein the first filter cover comprises a first cover body to close a predetermined portion of the opening of the casing, with a joining part provided on the first cover body to be locked to the casing, and
   the second filter cover comprises a second cover body to close a remaining portion of the opening, with a engaging part provided on the second cover body to engage with the fastening unit.

2. The filter cover assembly according to claim 1, wherein the fastening unit comprises:
   a rotary knob;
   a locking member; and
   a shaft to connect the rotary knob to the locking member.

3. The filter cover assembly according to claim 2, further comprising:
   a hole provided on the first filter cover to receive both the locking member and the shaft of the fastening unit.

4. The filter cover assembly according to claim 2, further comprising:
   a stop protrusion provided on the first filter cover to stop excessive rotation of the rotary knob of the fastening unit.

5. The filter cover assembly according to claim 1, further comprising:
   a hole provided on the engaging part of the second filter cover to lock the fastening unit to the second filter cover.

6. The filter cover assembly according to claim 1, wherein the fastening unit is integrated with the first filter cover into a single structure.

7. The filter cover assembly according to claim 1, wherein the second filter cover is integrated with the casing of the air conditioning unit into a single structure.

8. The filter cover assembly according to claim 1, further comprising:
   a joining part provided on the second cover body of the second filter cover to lock the second filter cover to the casing of the air conditioning unit.

9. The filter cover assembly according to claim 1, further comprising:
   a support part provided on the casing of the air conditioning unit to support the first cover body of the first filter cover or the second cover body of the second filter cover.

* * * * *